(12) United States Patent
Flynn et al.

(10) Patent No.: US 6,603,550 B1
(45) Date of Patent: Aug. 5, 2003

(54) DEVICE, KIT AND METHOD FOR SELECTING PERSONALIZED COLOR COSMETICS

(75) Inventors: Madeline DeMayo Flynn, Monroe, CT (US); Alan Joel Meyers, Trumbull, CT (US); Liam Anthony Murray, Monroe, CT (US)

(73) Assignee: FD Management, Inc., Wilmington, DE (US)

( * ) Notice: Subject to any disclaimer, the term of this patent is extended or adjusted under 35 U.S.C. 154(b) by 14 days.

(21) Appl. No.: 09/879,520

(22) Filed: Jun. 12, 2001

(51) Int. Cl.⁷ .................................................. G01J 3/50
(52) U.S. Cl. ....................... 356/402; 356/319; 356/326; 356/328
(58) Field of Search ................................. 356/402, 319, 356/326, 328; 364/400, 526; 434/100; 132/200

(56) References Cited

U.S. PATENT DOCUMENTS

| | | | | | |
|---|---|---|---|---|---|
| 4,160,271 A | * | 7/1979 | Grayson et al. | ............... | 700/90 |
| 4,232,334 A | * | 11/1980 | Dyson | ......................... | 348/77 |
| 4,909,632 A | * | 3/1990 | Simpson | ..................... | 356/402 |
| 4,911,544 A | * | 3/1990 | Walsh | ......................... | 359/839 |
| 6,000,407 A | * | 12/1999 | Galazin | ...................... | 132/200 |
| 6,412,658 B1 | * | 7/2002 | Bartholomew et al. | ........ | 222/1 |
| 6,437,866 B1 | * | 8/2002 | Flynn | .......................... | 356/402 |

* cited by examiner

Primary Examiner—Mohammad Sikder
(74) Attorney, Agent, or Firm—Herbert Dubno

(57) ABSTRACT

A skin color measuring device is provided for use with a kit and method to measure skin shades at point-of-sale. The device includes a hand holdable housing encompassing a spectrophotometer/colorimeter, a logic program for calculating L, a, b values measured by the spectrophotometer/colorimeter and for converting these values into corresponding shades of facial foundation cosmetic products suitable for the measured customer, and a display window formed in the wall of the housing allowing visualization of the logic selected facial foundation products. Kits in the form of a display case are provided which include the skin measuring device and an inventory of different facial foundation products as well as a reader card set for correlating the selected facial foundation products with complementary color cosmetics such as lipsticks, eye shadows, eye liners, blush and lip liners. Also disclosed is a method for evaluating the most suitable facial foundation for a customer and referencing a complementary other color cosmetic product with appropriate shade.

3 Claims, 3 Drawing Sheets

DEVICE, KIT AND METHOD FOR SELECTING PERSONALIZED COLOR COSMETICS

BACKGROUND OF THE INVENTION

1. Field of the Invention

The invention is concerned with a device, kit and method for selecting color cosmetics optimized to a customer's skin shade.

2. The Related Art

Selection of the optimal color shade is often a customer's chief concern in purchasing a cosmetic facial product. A number of companies in the industry have sought to render easier the selection process. Clinique and Clarion have installed computers at sales counters for use by the customer. Information on color shade, oiliness and other properties of a customer's skin are punched into the computer which then determines the company's most closely matching product.

Another point of sale technique has been that of custom blending. Two major companies, Prescriptives (division of Estee Lauder) and Visage (division of Revlon) begin a sale by manually evaluating a subject's skin color. The salesperson then adjusts existing finished foundations so as to match the evaluated skin color. Unfortunately, there are many disadvantages in the manual evaluation of color. The most obvious of these is that too much time is required for a match. Often there is a poor skin match, reproducibility is a problem and extensive training is required of the salesperson.

German Patent 41 10 299 C1 (Erdtmann) discloses a facial sensor to evaluate skin which is connected to an automatic cosmetic dispensing device for blending selected additives into a cosmetic base.

U.S. Pat. No. 5,622,692 (Rigg et al.) reports on a method and apparatus for customizing a facial foundation product at the point of sale to a customer. A skin analyzer is applied to a customer's face for reading skin properties. A programmable device then receives the reading and correlates same with an optimal formula. A formulation machine then prepares a facial foundation product based upon instructions received about the optimal formula. Chemicals are dosed and blended together from a series of dispensers each containing a monochromatic color composition. The optimal formula may be altered through customer preferences by manual alteration. A problem with this method is the expense and relative non-portability of the apparatus as well as the large, cumbersome monitor necessary to print out measured skin information.

Related technology with similar problems are reported in U.S. Pat. No. 5,785,960 (Rigg et al.) and U.S. Pat. No. 5,945,112 (Flynn et al.).

Accordingly, it is an object of the present invention to provide a device, kit and related method capable of quickly analyzing skin color and converting the analysis to identify a particular color shade optimal for the customer.

Another object of the present invention is to provide a device, kit and related method for identifying a color shade most suitable for a customer, particularly for foundation products, and based on such information to recommend complementary color cosmetics which are not foundations.

These and other objects of the present invention will become more readily apparent through consideration of the following summary, drawing and detailed description which follow.

SUMMARY OF THE INVENTION

A device is provided for recommending a cosmetic product color matched to a customer's skin including:

(i) a housing for the device of a size sufficiently small to be held in one hand;

(ii) a spectrophotometer/colorimeter mounted within the housing capable of measuring skin color values of lightness, redness and yellowness respectively denoted by L, a and b units;

(iii) a computer program lodged within the housing for receiving the measured skin color values and correlating them to products having a matching color; and (iv) a display screen fitted on an outer wall of the housing for displaying an image identifying the matching color, the image being selected from the group consisting of L, a and b units, alphanumerics, icons, words and combinations thereof.

Optionally, a program may be provided within the housing to receive the measured L, a and b values and recommend a color compatible shade of a further cosmetic product other than foundation selected from the group consisting of lipstick, eye liner, blush, eye shadow, lip liner, browliner, mascara, nail polish and combinations thereof.

Ordinarily the device may have a length ranging anywhere from about 5 cm to about 30 cm and a width ranging from about 2 cm to about 15 cm. Weight of the device may range from about 100 gm to about 5 kg, preferably from about 500 gm to about 2 kg.

Furthermore, a kit is provided for selecting and supplying facial cosmetic products color matched to a customer's skin which includes:

(A) a display platform upon which are arranged a plurality of facial foundation products, at least two of the products having a different color shade;

(B) a directory having a compilation of information correlating facial foundation colors to complementary shades of at least one second cosmetic product selected from the group consisting of lipstick, eye liner, blush, eye shadow, lip liner, browliner, mascara, nail polish and combinations thereof; and (C) a device for recommending to a customer an optimum facial foundation product suitable for that customer, the device including.

(i) a housing for the device of a size sufficiently small to be held in one hand;

(ii) a spectrophotometer/colorimeter mounted within the housing capable of measuring skin color values of lightness, redness and yellowness respectively denoted by L, a and b units;

(iii) a computer program lodged within the housing for receiving the measured skin color values and correlating them to products having a matching color; and (iv) a display screen fitted on an outer wall of the housing for displaying an image identifying the matching color, the image being selected from the group consisting of L, a and b units, alphanumerics, icons, words and combinations thereof.

Still further the invention provides a method for recommending a facial foundation product color matched to a customer's skin, the method including:

(A) providing a device for measuring the customer's facial skin color, the device including:

(i) a housing for the device of a size sufficiently small to be held in one hand;

(ii) a spectrophotometer/colorimeter mounted within the housing capable of measuring skin color values of lightness, redness and yellowness respectively denoted by L, a and b units;

(iii) a computer program lodged within the housing for receiving the measured skin color values and correlating them to products having a matching color; and (iv) a display screen fitted on an outer wall of the housing for displaying an image identifying the matching color, the image being selected from the group consisting of L, a and b units, alphanumerics, icons, words and combinations thereof;

(B) measuring with the device a customer's skin coloration with the spectrophotometer/colorimeter to obtain values of lightness, redness and yellowness respectively denoted by L, a and b units;

(C) identifying through the computer program stored within the housing a matching color facial foundation product based upon the measured spectrophotometer/colorimeter values; and (D) displaying the identified facial foundation product on the screen of the device.

BRIEF DESCRIPTION OF THE DRAWING

Further features, objects and advantages of this invention will more readily be viewed through consideration of the following drawing, in which.

DETAILED DESCRIPTION OF THE INVENTION

Now a device, kit and method has been developed related to measuring a customer's facial color and to recommend an appropriate shade of foundation matching the customer's skin. The matching color and correlated product information is presented on a display window placed within a housing common to the spectrophotometer. A particularly attractive aspect of the device used in the kit and method is its portability and lower manufacturing cost in comparision to earlier systems requiring being tethered to a personal computer.

Figure 1:
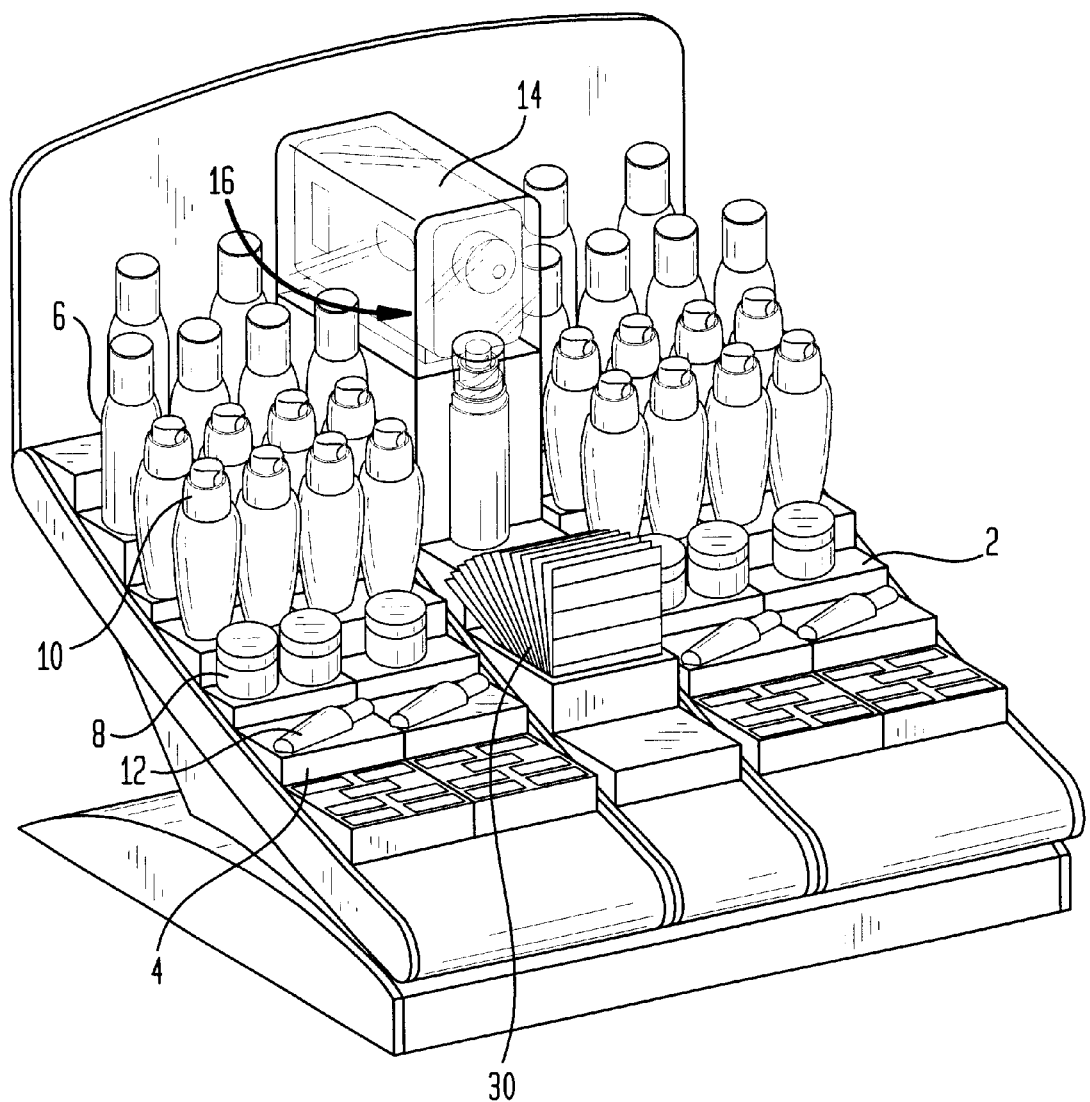
FIG. 1 is a plan perspective view of a kit according to the present invention.

FIG. 1 illustrates the kit. A platform 2 with a series of steps 4 is supplied with several types of foundation products. These products include liquid foundation 6, powder foundation 8, mousse foundation 10 and sponge foundation 12. A probe 14 rests upon a pedestal 16.

Figure 2:
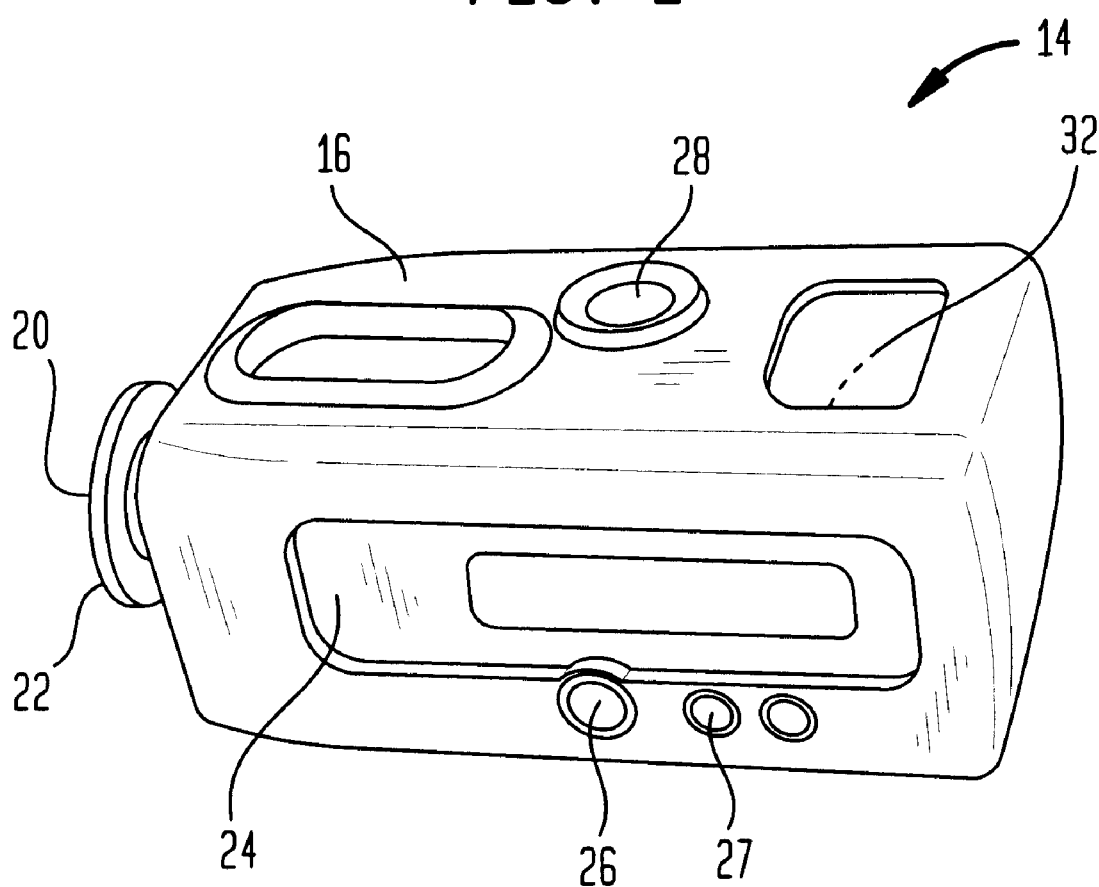
FIG. 2 is a plan perspective view of a skin measurement device.

FIG. 2 illustrates probe 14 in greater detail. A housing 16 supports the various components of the probe. Within the housing is a spectrophotometer having a light emission shaft 20 ending in a window 22 protruding from one end of the housing. LED display window 24 is formed on a side wall of the probe. Fifteen characters can be displayed within window 24. Below the display window is a reader activating button 26 and reset button 27. Along a top wall of the housing is a further button 28 which activates light measurement by the spectrophotometer.

Probe 14 is tethered to the display box 2 through a chain as a measure for inhibiting theft. Alternatively an alarm medallion can be placed on the probe. Upon attempting to exit the store, the medallion will activate clothing tag sensors normally placed at entrances and exit doorways of a department store.

Additionally the display case 2 includes a set of recipe cards 30 in the form of a Rolodex®. Color cosmetics other than foundations are listed on the recipe cards in a manner indexing particular probe recommended make-up shades with other of the color cosmetics such as lipstick, eye liner, blush, eye shadow and lip liner.

Figure 3:
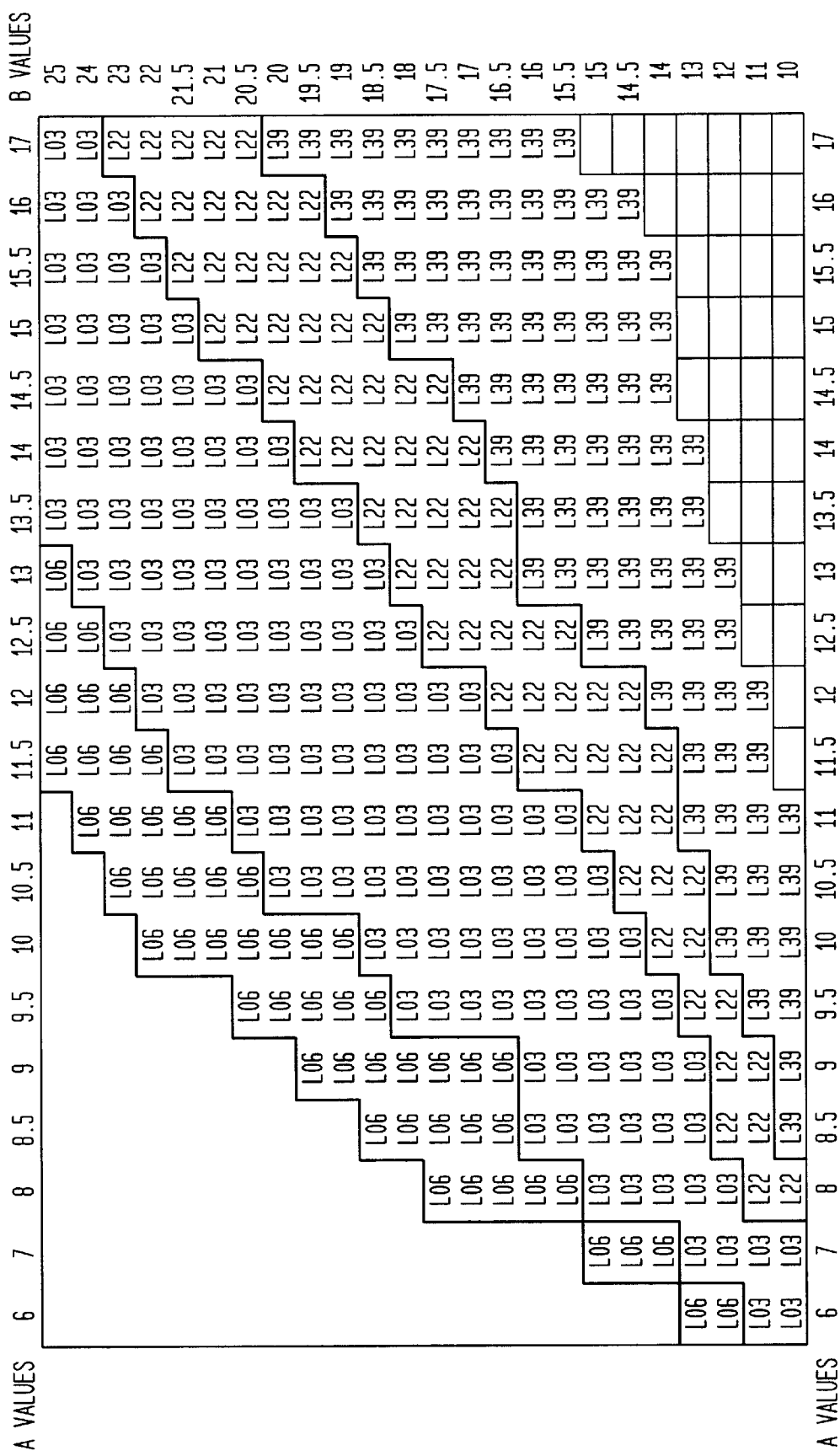
FIG. 3 is a recommended product versus Lab grid for L=67.

Human skin color occupies only a small portion of three dimensional color space. In the present invention the color space has been divided into sections based on L values for depth of skin, as well as a and b values for tonality. Commercial foundation formulations are evaluated and assigned L a b values and placed into appropriate color space sections. See FIG. 3. These color space sections are then programmed into a logic chip 32 of the probe. L a b measurements on a customer are then compared to the color space grid of FIG. 1. Digital display in the window of the probe will then display the number (or other reference symbol) of make-up calculated as most suitable from the programmed logic chip. For example, if our L value is 67, FIG. 1 would provide the following recommendations dependent upon the a and b values.

| L value | a value | b value | Recommended Make-up |
| --- | --- | --- | --- |
| 67 | 11.5 | 12 | Shell Make-up (L39) |
| 67 | 13.5 | 17 | Vanilla Make-up (L22) |
| 67 | 12 | 19 | Sunbeige Make-up (L03) |
| 67 | 11 | 22 | Golden Beige (L06) |

The spectrophotometer/colorimeter according to the present invention will have at least one visible light source such as LED, xenon-arc, tungsten, halogen or the like. Suitable skin analyzers are commercially available from Minolta Camera Co., Ltd., Japan (Minolta Spectrophotometer/Colorimeter CR-10), from Colortec Associates, Accuracy Measurements and X-Rite.

The method of the present invention involves orienting the spectrophotometer window against an area of a customer's jawline/neck. This area is cleaned prepatory to a reading. The instrument window 22 is then placed in proximity to the cleaned facial area. Visible light emitted in the 400–900 nm range will be reflected off the skin surface and the reflected wavelength measured in terms of L, a and b values. A total of from one to five skin readings are taken along the jawline/neck region. These measured values are then transferred within the probe to a logic chip 32 having an algorithm which converts the measured L,a, b values into a recommended shade. Particular shades of liquid (L) powder (D), mousse (M), sponge (S) and stick (T) foundation are then identified as correlating to the measured values. These foundation product choices are then displayed in the display window. In the embodiment shown, each foundation type and shade is described in code form. For instance, the code L01D01M23S02T0S represents shade by a number and foundation type by a letter. L, a, b values are also listed within the display window for future reference such as storage on an Internet web site.

Once foundation color shades have been identified, the customer can be assisted in locating corresponding color cosmetic products through reference to the recipe cards 30 in the display case. The cards maintain information on a host of color shades for lipstick, eye liner, eye shadow, blush and lip liner. For instance, lipstick will ordinarily lie within the shades of red, pink, coral, plum and neutral. From six to twelve different lipstick colors lie within each of the primary five ranges. Blush (cheek color) ordinarily is categorized within the three groups of pink/plum/berry, neutral/peach, and red/coral. Lip pencils ordinarily may be categorized within red, pink, coral, plum and neutral. Eye shadow is characterized among neutral/coral/brown, pink/purple/plum, yellow/green, blue/gray and special effects. Particular shades of each of the aforementioned are correlated as complementary to the measured value for foundation color shade.

Among the capabilities of the probe are the ability to compare skin color value, weigh important attributes and recommend a foundation shade that is within an existing product portfolio. The logic is programmable with up to 8 regionally specific shade palettes and the ability to easily modify those shades. Memory storage for the present embodiment is up to 100 foundation shade specifications. With the probe, a customer consultant can accurately determine which color products are complementary. The consumer is assured of getting an accurate shade.

Alternative to recipe cards can be a further expansion of the probe in its memory and display functions. With a more powerful logic and display window, recipe cards can be computerized within the probe logic. A larger display window can then be utilized to reference complementary color shaded lipstick, eye liner, eye shadow, blush, lip liner, browliner, mascara and nail polish.

Besides skin coloration, a variety of other skin characteristics may be measured. These include moisturization, oiliness, texture, irritation, sensitivity, skin tone and markers of skin health such as radiance, skin damage, or age such as age spots.

The foregoing description and examples illustrate selected embodiments of the present invention. In light thereof variations and modifications will be suggested to one skilled in the art, all of which are within the spirit and purview of this invention.

What is claimed is:

1. A device for recommending a cosmetic product color matched to a customer's skin comprising:
   (i) a housing for the device of a size sufficiently small to be held in one hand;
   (ii) a spectrophotometer/colorimeter mounted within the housing capable of measuring skin color values of lightness, redness and yellowness respectively denoted by L, a and b units;
   (iii) a computer program lodged within the housing for receiving the measured skin color values and correlating them to products having a matching color; and
   (iv) a display screen fitted on an outer wall of the housing for displaying an image identifying the matching color, the image being selected from the group consisting of L, a and b units, alphanumerics, icons, words and combinations thereof.

2. The device according to claim 1 wherein the image in the display screen refers to particular color shades for each of a liquid, cream, mousse and sponge form of foundation.

3. A method for identifying a customer's optimal shade of the facial foundation product, the method comprising:
   (A) providing a device for measuring a customer's optimal shade of a facial foundation product, the device comprising:
      (i) a housing for the device of a size sufficiently small to be held in one hand;
      (ii) a spectrophotometer/colorimeter mounted within the housing capable of measuring skin color values of lightness, redness and yellowness respectively denoted by L, a and b units;
      (iii) a computer program lodged within the housing for receiving the measured skin color values and correlating them to products having a matching color; and
      (iv) a display screen fitted on an outer wall of the housing for displaying an image identifying the matching color, the image being selected from the group consisting of L, a and b units, alphanumerics, icons, words and combinations thereof;
   (B) measuring with the device a customer's skin coloration with the spectrophotometer/colorimeter to obtain values of lightness, redness and yellowness respectively denoted by L, a and b units;
   (C) identifying through the computer program stored within the housing a matching color facial foundation product based upon the measured spectrophotometric/colorimeter values; and
   (D) displaying the recommended facial foundation products on the screen of the device.

* * * * *